United States Patent
Vennemeyer et al.

(10) Patent No.: US 6,360,778 B1
(45) Date of Patent: Mar. 26, 2002

(54) MODULATOR BODY AND FLUID ACCUMULATOR FOR USE IN VEHICLE BRAKE SYSTEM

(75) Inventors: Alfred C. Vennemeyer, Englewood; Dewey F. Mort, Dayton, both of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/789,268

(22) Filed: Feb. 20, 2001

(51) Int. Cl.⁷ ................................................ F16L 55/04
(52) U.S. Cl. ............................ 138/31; 138/30; 138/177
(58) Field of Search ............................... 138/26, 30, 31, 138/177

(56) References Cited

U.S. PATENT DOCUMENTS

| | | | | |
|---|---|---|---|---|
| 1,932,666 A | * | 10/1933 | Hyatt | 138/31 X |
| 3,198,213 A | * | 8/1965 | Schindel | 138/31 |
| 3,593,747 A | * | 7/1971 | Mercier | 138/30 |
| 4,174,656 A | * | 11/1979 | Duffey | 138/31 X |
| 4,463,603 A | * | 8/1984 | Welker | 138/31 X |
| 5,031,664 A | * | 7/1991 | Alaze | 138/171 |
| 5,354,187 A | * | 10/1994 | Holland et al. | 138/31 X |
| 5,542,453 A | * | 8/1996 | Gabas | 138/30 |
| 5,590,936 A | | 1/1997 | Reuter | 303/116.1 |
| 5,620,028 A | | 4/1997 | Johnston et al. | 138/31 |
| 5,735,314 A | | 4/1998 | Alaze et al. | 138/31 |

* cited by examiner

Primary Examiner—Patrick Brinson
(74) Attorney, Agent, or Firm—Scott A. McBain

(57) ABSTRACT

A system, device and method of sealing a fluid accumulator assembly to a modulator body in a hydraulic fluid brake system provides a fluid modulator having a body with at least one fluid passageway formed therein. At least one socket is formed in a surface of the body in communication with the at least one fluid passageway. An accumulator assembly includes a housing with an open end. The open end includes a tapered lead-in, the tapered lead-in being positioned in the socket. The socket includes a seizing taper configuration, the angle of the seizing taper being complementary to an angled portion of the tapered lead-in. The housing of the accumulator includes a stake groove. Material from the body is staked into the stake groove, retaining the accumulator to the body thereby.

18 Claims, 3 Drawing Sheets

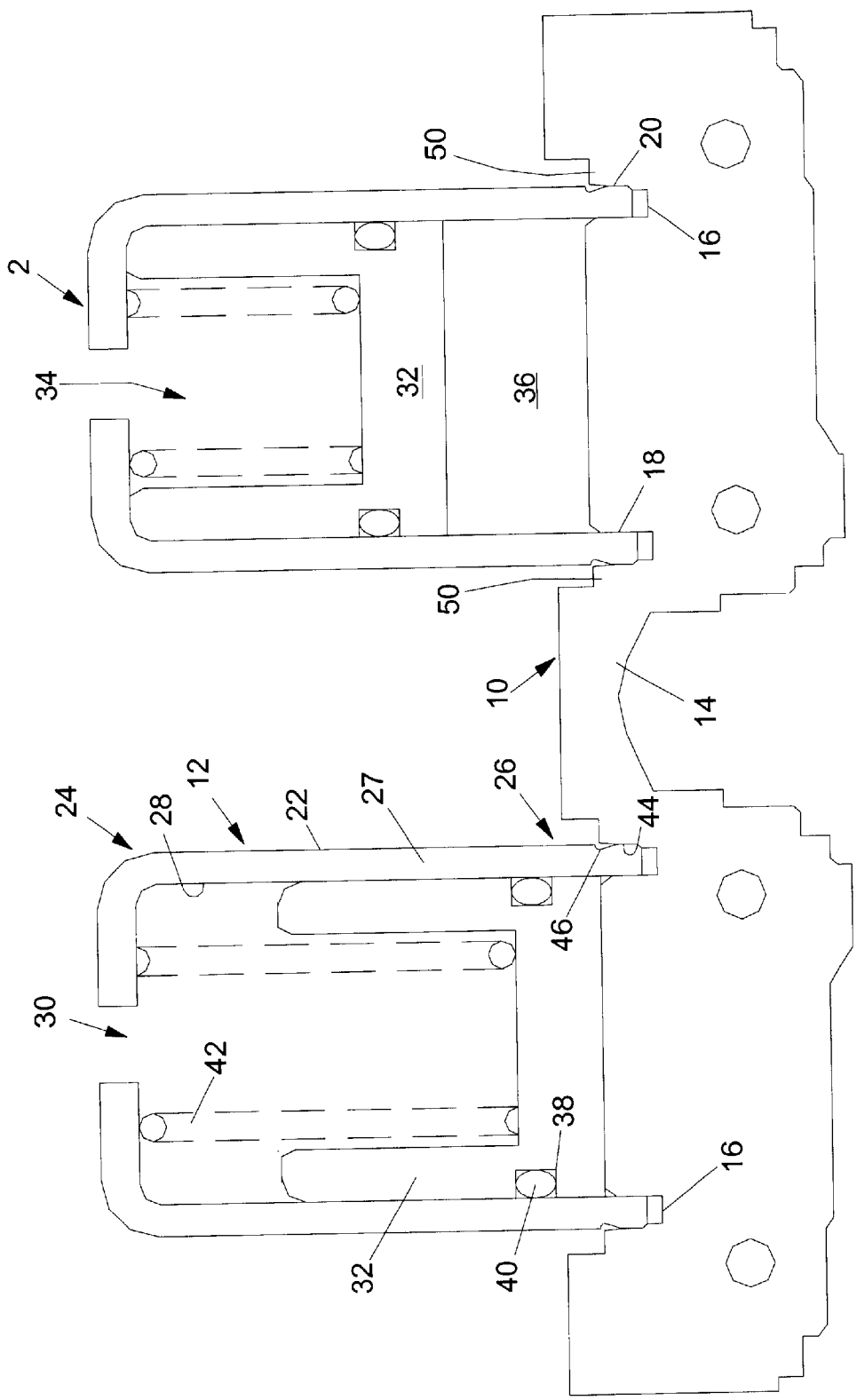

MODULATOR BODY AND FLUID ACCUMULATOR FOR USE IN VEHICLE BRAKE SYSTEM

TECHNICAL FIELD OF THE INVENTION

The present invention relates to fluid brake systems. In particular, the invention is directed to a fluid brake system, including a brake module with an associated accumulator. The accumulator and a method of affixing the accumulator to the brake module are described.

BACKGROUND OF THE INVENTION

A hydraulic control unit of a vehicle braking system typically includes a number of devices that cooperate to control fluid pressure in a vehicular braking system, and in particular in an anti-lock braking system. Many of the devices, which include solenoids, valves, pumps, attenuators, accumulators and so on, are conventionally housed in a central unit hydraulic body. In a fluid brake system a controlled source of pressurized braking fluid is an essential element. A manually actuated master brake cylinder or an associated hydraulic pump generally provides the pressurized fluid. Accumulators have found use in such systems for providing fluid during brake-apply cycles. Accumulators also provide a point of accumulation for fluid during brake release cycles in systems with antilock functions.

In general, an accumulator includes a device that allows the storage of fluid in a hydraulic system. Prior art accumulators include such devices typically embodied as a spring-loaded piston accumulator positioned within a bore formed in a manifold or housing of a modulator body. In controlling the application of pressure, many systems utilize at least one fluid accumulator that is operative to temporarily receive in-store brake fluid, for example, during pressure reduction phases of the antilock operation. The accumulator typically maintains fluid stored therein at a predetermined pressure maintained by a spring that acts on an accumulator piston. Since, in these systems, the accumulator must be accommodated along with a number of other devices in the interior of the modulator, the size and mass of the modulator body is adversely affected by the inclusion of the integral internal accumulator.

It would be desirable to provide an accumulator for a fluid brake system that reduces the size and mass of an associated modulator body or the like and provide design flexibility. It would be desirable to provide a method of securing an accumulator onto a modulator body that reduces the number of parts and processes therefore. Other benefits of the assembly and method of the present invention will become apparent in the following description and accompanying illustrations.

SUMMARY OF THE INVENTION

One aspect of the present invention provides an accumulator assembly for use in a hydraulic control system that includes an accumulator housing including a lower end. The lower end of the housing includes a lead-in portion and a stake groove formed adjacent the tapered lead-in.

Other aspects of the invention provide an accumulator assembly with the tapered lead-in having an angled outer portion angled between about 0 and 15 degrees. The tapered lead-in can have an angled outer portion having an angle between about 5 and 10 degrees. The tapered lead-in can have an angled outer portion having an angle of about 7.5 degrees. The accumulator assembly housing can be made of aluminum. The aluminum can be 2011-T3 aluminum or 6061 aluminum. The stake groove can include a flat annular portion being angled between about 5 and 30 degrees. The flat annular portion of the stake groove can be angled at about 15 degrees. The flat annular portion can be formed adjacent the tapered lead-in and a curved incut portion can be formed adjacent the flat annular portion. The stake groove can be a curved stake groove or a triangular stake groove. The stake groove can include a flange portion. The flange portion can extend outwardly from the accumulator housing. The flange can include an upper surface.

Another aspect of the present invention provides a fluid modulator and accumulator assembly including a fluid modulator having a body including at least one socket formed on an outer surface thereof and an accumulator assembly including a housing including an end portion, the end portion including a tapered lead-in, the tapered lead-in fitted in the socket.

Other aspects of the invention provide a socket with a seizing taper configuration, the angle of the seizing taper being complementary to an angled portion of the tapered lead-in. The end portion of the accumulator housing can include a stake groove formed therein, the stake groove located adjacent the tapered lead-in. The tapered lead-in can include a portion angled between about 5 to 10 degrees. The body can include a stake portion including stake material positioned peripherally with respect to the socket, the stake material can be adapted to deform into the stake groove of the accumulator housing.

Another aspect of the invention provides a method of attaching a modular accumulator to a modulator body including positioning a tapered lead-in of an accumulator housing of the accumulator into a socket formed in an outer portion of the modulator body, applying a force to an outer portion of the accumulator housing, forcing the accumulator housing into a seize position within the socket, and forcing a stake portion of the modulator body into a stake groove formed in the accumulator housing to retain the housing in the socket.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 1 illustrates a cross-sectional view of one embodiment of a brake system modulator body with a pair of accumulators of the present invention positioned for attachment thereto;

DETAILED DESCRIPTION OF THE PRESENTLY PREFERRED EMBODIMENT

Figure 5:
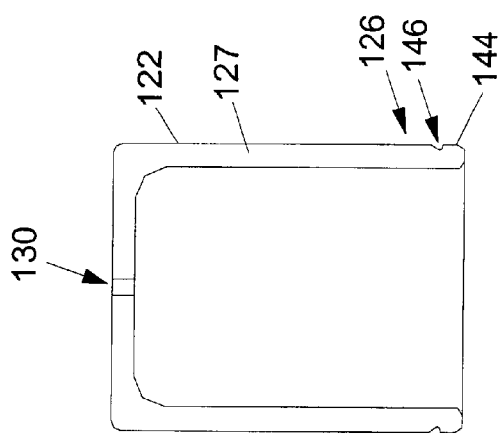
FIG. 5 illustrates a cross-sectional view of another embodiment of an accumulator.

Referring to the drawings, illustrated in FIG. 1 is an embodiment of the brake module or modulator 10 incorporating the modular accumulator assembly 12 of the present invention. The accumulator assembly 12 can be positioned upon a brake modulator 10. The brake modulator 10 can include a body 14 of a rigid material. One acceptable material can be metal. The body 14 can include a system of communicative fluid passageways (not shown) formed therein.

The body 14 includes at least one socket or mounting groove 16 formed on a surface thereof. The mounting groove 16 is a circular groove. In one embodiment, the groove includes an outwardly angled outer wall 20 and inner wall 18. The amount of angle of the outer wall 20 can be from about 0 to 10 degrees. In one embodiment, the angle is about 7.5 degrees. Thus, the groove 16 becomes narrower with increased depth. This angle can be referred to as the inlet angle. The inlet angle is designed to allow an associated accumulator assembly 12 to be press fit thereto. The angled feature of the socket 16 provides a press fit or seizing taper with the accumulator 12. It should be understood at the angle of the inlet taper can be dependent upon the materials chosen for the body 14 and accumulator housing 22. Thus, the coefficient of friction of the materials can be considered when selecting the inlet angle to provide a seizing taper between components.

The accumulator assembly 12 can include an accumulator housing 22. The accumulator housing 22 can be a straight-sided cup. The housing 22 is (essentially) closed at an upper end 24 and open at a lower end 26. The housing 22 can be manufacturing by conventional extruding, machining or casting methods. In one embodiment, the housing 22 can be formed of aluminum. In another embodiment, the housing 22 is formed of 2011-T3 aluminum. Regardless of manufacturing method, the housing 22 can include sidewall portion 27 defining chamber 28. The sidewall portion 27 of chamber 28 may be further machined and/or polished to an acceptable surface condition. A vent 30 can be formed at in the upper end 24 of the housing 22. Vent 30 can be formed by drilling or other methods. The vent 30 communicates with atmosphere to allow gas to enter and exit the accumulator housing 22 as will be explained more fully hereinafter.

As shown in FIG. 1, a piston 32 can be slidably disposed within the chamber 28 of accumulator housing 22. The piston 32 can be formed of any suitable material, including metal. The piston 32 can define a first (or gas) chamber 34 with the upper end 24 of the accumulator housing 22, which is open to atmosphere by way of the vent 30, and a second (or fluid) expandable chamber 36 with the body 14. It should be understood that the fluid chamber 36 is permitted to communicate with the system of communicative passageways in the body 14. The piston 32 can have an annular piston groove 38 formed about the perimeter of the piston 32. A seal 40, which can be an elastomeric or o-ring seal, can be positioned in the annular piston groove 38 to seal with the chamber 28 of the accumulator housing 22 and prevent the escape of fluid. Between the upper end 24 of the housing 22 and the piston 32 a spring 42 can be provided to bias the piston 32 away from the upper end 24 of the housing 22. The spring 42 may be a coil spring, or any other suitable biasing means.

The lower end 26 of the accumulator housing 22 is open. The lower end 26 of the housing 22 terminates with a configuration that allows the lower end 26 to be sealed (by press fit, i.e., a seizing taper) and retained to the modulator body 14 (by staking, or the like). The configuration of the lower end 26 of the accumulator housing 22 can include a tapered lead-in or angled portion 44 that can cooperate or correspond to the angle of outer wall portion 20 of the tapered groove 16 in the body 14. The cooperation or correspondence of the tapered lead-in 44 and the outer wall 20 portions can include where the angles match each other or substantially match each other, i.e., are within a small number of degrees of each other. This cooperation allows a press-fit relationship between the lead-in and the socket. In one preferred embodiment, the tapered lead-in 44 can be about 7.5 degrees from the axial direction with a cooperating portion 20 of the groove 16 also having a matching angle thereto.

Adjacent the tapered lead-in 44 is a groove or stake groove 46 formed in the outer diameter or circumference of the sidewall 27 of housing 22. As will be seen, and described more fully in the following illustrated embodiments, the groove 46 can have various configurations. Generally, the groove 46 can be designed to retain the housing 22 in the socket 16 of body 14 when material from the body is crimped or staked into the groove. The groove geometry and stake angle are set such that it allows for variation in the housing 22 height due to machining tolerances on the tapered lead-in 44 and to allow for staking of a body 14 with materials of low elongation that are preferred for machinability but will also shear if too much material is moved during staking. It should be understood that the accumulator housing 22 is shown in FIG. 1 in a condition before the staking procedure secures the housing 22 to the body 14. In other words, the housing 22 is shown in position to be staked, but no material has been staked from the stake material area 50 of the body 14 to fill the stake groove 46 of the housing 22.

It will be further understood that the accumulator assembly 2 on the right-hand side of the illustration is in a condition where fluid has displaced the piston 32 upwardly into the housing 22. In pressure reduction phases of an anti-lock control operation, fluid is thusly temporarily stored in the chamber 36 of accumulator assembly 2. During brake system operation, when fluid communicates into the fluid chamber 36, the piston 32 is urged to move in a direction to expand the fluid chamber 36, and thus, stores pressurized fluid from the brake system (not shown). When pressure drops, the fluid in the fluid chamber 36 exits. It can be seen that the accumulator assembly 12 on the left-hand side of the illustration is shown in a condition where fluid pressure is not sufficient to displace the piston 32 upwardly against the bias of the spring 42, and accordingly, no fluid is stored in the accumulator 12.

Referring to FIGS. 1–4, illustrated is one embodiment of an accumulator housing 22 of the present invention. The housing 22 can be a generally cup shaped housing. The housing 22 can include a closed upper end 24 with a vent 30 formed therein. The vent 30 communicates with an inner chamber 34 formed by the housing 22 and allows gas to pass from the inner chamber 34 to atmosphere. The sidewall 27 of the housing 22 extends from the upper end 24 to an open lower end 26 of the housing. In the embodiment shown, adjacent the extreme lower end 26 of the housing sidewall 27 is a tapered lead-in portion 44. The tapered lead-in 44 can include parallel inner sidewall 43 and angled outer portion or sidewall 45. The angled outer sidewalls 45 can taper at an angle of about 7.5 degrees (as shown at A).

Adjacent the lead-in portion 44 of the lower portion 26 of the sidewalls 27 is the stake groove 46. In the present embodiment, the shape of cross-section of the stake groove 46 includes a flat angled portion 52 (about 15 degrees from the axial as shown at B) adjacent the lead-in portion 44, and a curved incut portion 54 adjacent the flat angled portion 52.

Figure 3:
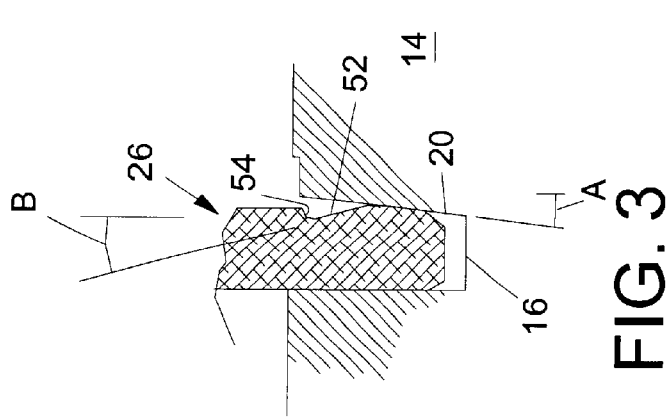
FIG. 3 illustrates an expanded cross-sectional view of a portion of the accumulator of FIG. 2.
Figure 4:
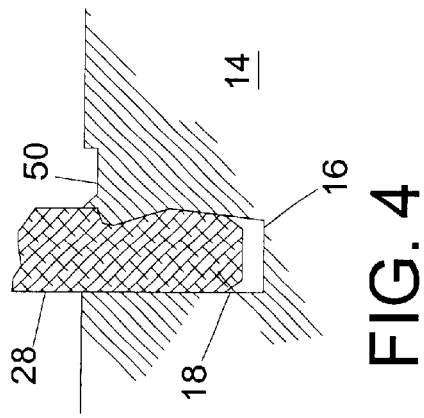
FIG. 4 illustrates the accumulator view of FIG. 3 staked to a modulator body.
Figure 2:
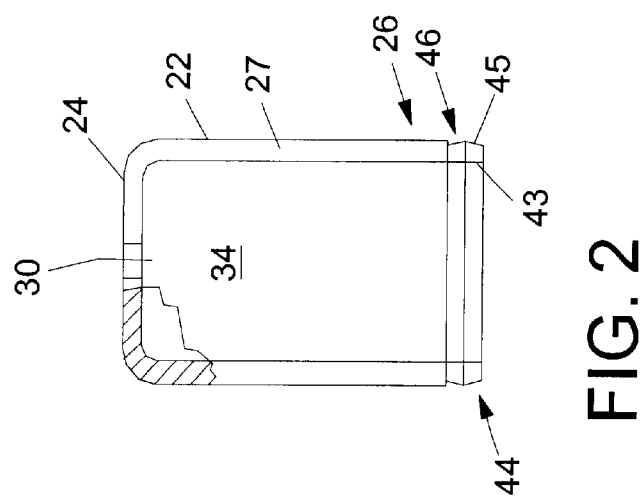
FIG. 2 illustrates a side view with a partial cutaway cross-sectional view of the accumulator of FIG. 1.

In FIG. 3, illustrated is a partial view of the lower end 26 of the accumulator sidewall 27 inserted into a socket 16 of a modulator body 14. The housing lower end 26 can be press-fitted into the socket 16 (18, 20) to the "seize position", i.e., the position which with an applied force of about 3,000 pounds. The stake material of the body 14 is shown generally at 50 in FIG. 4, after staking. The stake material 50 of the body has been "staked" or pressed into the stake groove 52, 54 of the housing lower end 26. The staking process includes staking or crimping the staking material with an applied force of about 12,000–15,000 pounds. In this manner the housing 22 can be retained and sealed to the body 14. It has been determined that such an arrangement can seal the housing 22 to the body 14 with no fluid leakage to about 3,000 p.s.i.

Referring to FIG. 5, illustrated is another embodiment of an accumulator housing 122 of the present invention. The illustrated housing is like that shown in FIG. 2 in most respects but for the configuration of the lower end 126 of the housing sidewall 127. In particular, the lower end 126 includes a tapered lead-in 144 cooperating or corresponding to the taper of a corresponding socket of a body (not shown). Formed adjacent the leading 144 portion is a stake groove 146 located about the circumference of the outer sidewall portion 127. In the illustrated embodiment, the stake groove 146 is a curved or generally triangular hook-shaped groove. The curved groove 146 can retain the housing 122 in a manner similar to that of the groove 46 shown in FIGS. 2–4. Vent 130 can be provided to allow gas to move in and out of the housing.

Figure 6:
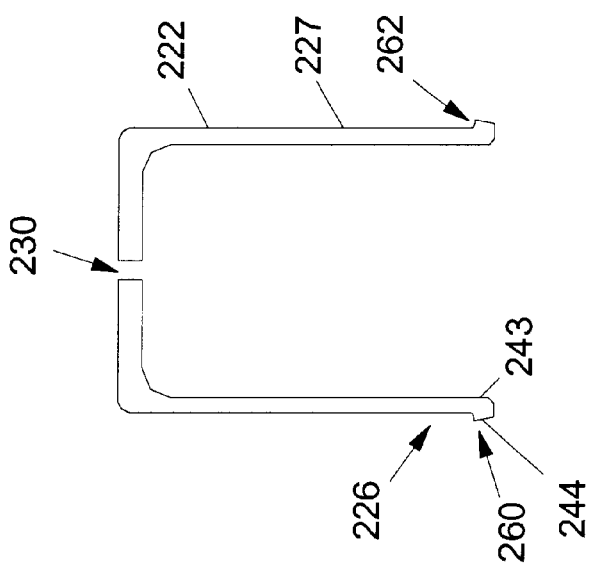
FIG. 6 illustrates a cross-sectional view of another embodiment of an accumulator.

Referring to FIG. 6, illustrated is another embodiment of an accumulator housing 222 of the present invention. The illustrated housing 222 can include an annular flange 260 extending outwardly from the lower sidewall portion 226. The annular flange 260 can include an outer tapered portion 244 that forms the tapered lead-in with the inner sidewall 243. The upper surface 262 of the flange 260 can extend outwardly from the outer sidewall 227 in a perpendicular direction. During the staking operation, material from the body can be formed over the upper surface 262 to retain the housing 222 in the body. Vent 230 can be provided to allow gas to move in and out of the housing. It will be understood that the vent 230 may be omitted in some embodiments.

Figure 7:
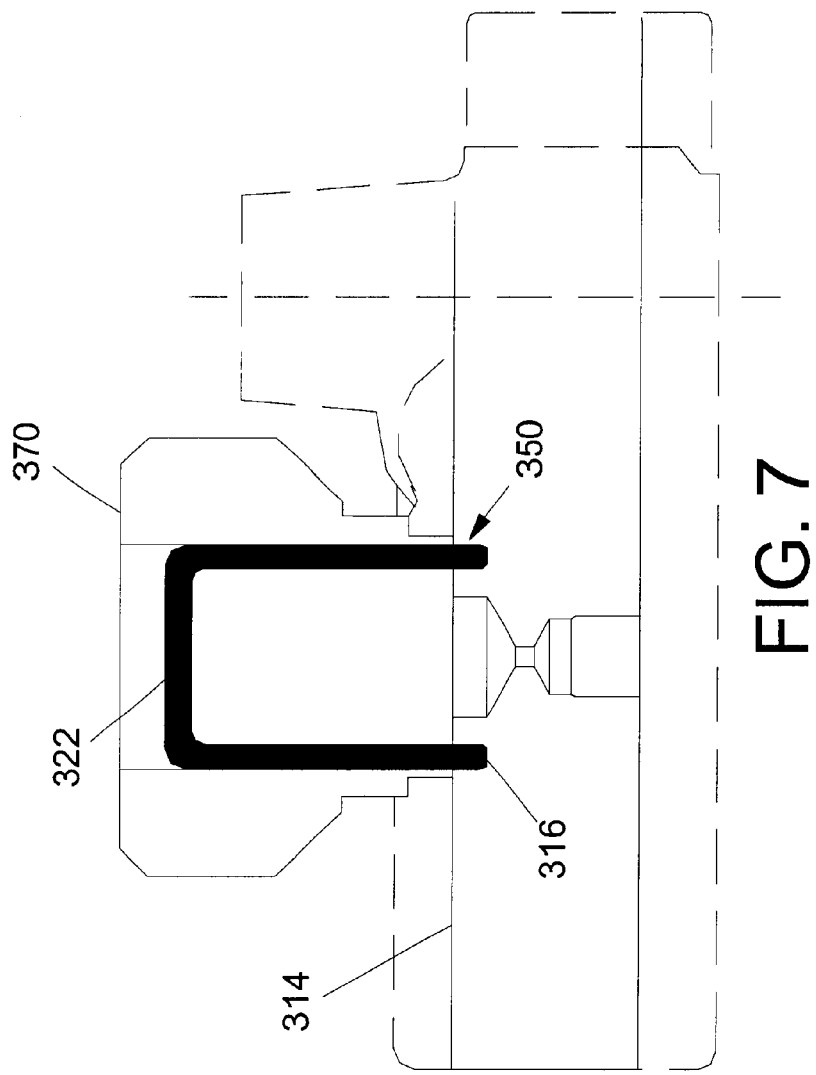
FIG. 7 illustrates a cross-sectional view of a staking tool in position to fasten an accumulator of the present invention to a modulator body.

The assembly of the housing 322 into the body 314 is described with reference to FIG. 7. The accumulator (including a piston and spring, not shown) 322 can be aligned with a socket 316 on the modulator body 314. A force can be applied to the accumulator housing 322 to insert the housing 322 into the body 314 to a seize position. A force can be applied to a stake head 370 to stake or crimp the stake material 350 about the perimeter of the socket 316. It can be seen that due to deforming the body 314, no clips, flanges, welds, fasteners or other retaining devices are necessary. Thus, assembly of housing 322 into modulator body 314 is simplified without the need for additional fasteners, and design flexibility of the assembled modulator body 314 with accumulators is maximized.

While the embodiment of the invention disclosed herein is presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. An accumulator for use with a fluid modulator body in a hydraulic control system comprising:

an accumulator housing including a lower end including a tapered lead-in portion formed on the housing and a stake groove formed on an outside surface of the housing adjacent the tapered lead-in, wherein the stake groove is adapted to cooperate with a stake portion of the fluid modulator body to retain the housing to the fluid modulator body.

2. The accumulator of claim 1 wherein the tapered lead-in has an angled outer portion having an angle between about 0 and 15 degrees.

3. The accumulator of claim 1 wherein the tapered lead-in has an angled outer portion having an angle between about 5 and 10 degrees.

4. The accumulator of claim 1 wherein the tapered lead-in has an angled outer portion having an angle of about 7.5 degrees.

5. The accumulator of claim 1 wherein the accumulator housing comprises aluminum.

6. The accumulator of claim 5 wherein the aluminum is 6061 aluminum.

7. The accumulator of claim 1 wherein the stake groove includes a flat annular portion being angled between about 5 and 30 degrees.

8. The accumulator of claim 7 wherein the flat annular portion of the stake groove is angled at about 15 degrees.

9. The accumulator of claim 7 wherein the flat annular portion is formed adjacent the tapered lead-in and a curved incut portion is formed adjacent the flat annular portion.

10. The accumulator of claim 1 wherein the stake groove is a curved stake groove.

11. An accumulator for use in a hydraulic control system comprising:

an accumulator housing including a lower end including a tapered lead-in portion and a stake groove formed adjacent the tapered lead-in, wherein the stake groove is a triangular stake groove.

12. An accumulator for use in a hydraulic control system comprising:

an accumulator housing including a lower end including a tapered lead-in portion and a stake groove formed adjacent the tapered lead-in, wherein the stake groove includes a flange, wherein the flange extends outwardly from the accumulator housing.

13. The accumulator of claim 12 wherein the flange includes an upper surface.

14. A fluid modulator and accumulator assembly comprising:

a fluid modulator having a body including at least one socket formed on an outer surface thereof; and an accumulator assembly including a housing including an end portion, the end portion including a tapered lead-in, the tapered lead-in fitted in the socket, wherein the socket has a seizing taper configuration, the angle of the seizing taper being complementary to an angled portion of the tapered lead-in.

15. The assembly of claim 14 wherein the end portion of the accumulator housing includes a stake groove formed therein, the stake groove located adjacent the tapered lead-in.

16. The assembly of claim 14 wherein the tapered lead-in has a portion angled between about 5 to 10 degrees.

17. A fluid modulator and accumulator assembly comprising:
- a fluid modulator having a body including at least one socket formed on an outer surface thereof; and
- an accumulator assembly including a housing including an end portion, the end portion including a tapered lead-in, the tapered lead-in fitted in the socket, wherein the body includes a stake portion including stake material positioned peripheral to the socket, the stake material being adapted to deform into the stake groove of the accumulator housing.

18. A method of attaching a modular accumulator to a modulator body comprising:

- positioning a tapered lead-in of an accumulator housing of the accumulator into a socket formed in an outer portion of the modulator body;
- applying a force to an outer portion of the accumulator housing;
- forcing the accumulator housing into a seize position within the socket; and
- forcing a stake portion of the modulator body into a stake groove formed in the accumulator housing to retain the housing in the socket.

* * * * *